(12) United States Patent
Seibt et al.

(10) Patent No.: US 8,613,115 B2  
(45) Date of Patent: Dec. 24, 2013

(54) MONITORING DEVICE FOR A VACUUM TOILET

(75) Inventors: Christian Seibt, Buchholz (DE); Matthias Mueller, Harsefeld (DE)

(73) Assignee: Airbus Operations GmbH, Hamburg (DE)

(*) Notice: Subject to any disclaimer, the term of this patent is extended or adjusted under 35 U.S.C. 154(b) by 436 days.

(21) Appl. No.: 12/940,338

(22) Filed: Nov. 5, 2010

(65) Prior Publication Data

US 2011/0099700 A1    May 5, 2011

Related U.S. Application Data

(60) Provisional application No. 61/258,425, filed on Nov. 5, 2009.

(30) Foreign Application Priority Data

Nov. 5, 2009    (DE) .................. 10 2009 052 046

(51) Int. Cl.
  *E03D 5/00* (2006.01)
(52) U.S. Cl.
  USPC .................... 4/249; 4/253; 4/246.1
(58) Field of Classification Search
  CPC .................................................. A47K 13/245
  USPC .................................................. 4/246.1, 253
  See application file for complete search history.

(56) References Cited

U.S. PATENT DOCUMENTS

| | | |
|---|---|---|
| 1,134,755 A * | 4/1915 | Marcuse ........................... 4/234 |
| 1,743,079 A | 1/1930 | Burkett et al. |
| 3,404,411 A | 10/1968 | Newkirk |
| 4,707,867 A | 11/1987 | Kawabe et al. |
| 5,123,124 A | 6/1992 | Brower |
| 5,187,818 A | 2/1993 | Barrett, Sr. et al. |

(Continued)

FOREIGN PATENT DOCUMENTS

| | | |
|---|---|---|
| DE | 3811 162 A1 | 10/1988 |
| DE | 43 01 429 A1 | 8/1993 |

(Continued)

OTHER PUBLICATIONS

German Office Action for German Application No. 10 2009 052 046.5-25 mailed Aug. 9, 2010.

(Continued)

*Primary Examiner* — Gregory Huson  
*Assistant Examiner* — Janie Christiansen  
(74) *Attorney, Agent, or Firm* — Ingrassia Fisher & Lorenz, P.C.

(57) ABSTRACT

A monitoring device and method are provided for monitoring a vacuum toilet, as well as a personal transport vehicle, in particular an aircraft, which uses a monitoring device for vacuum toilets. The monitoring device has a position detector for detecting the position of a toilet lid, a mechanical latching device and a flushing control unit. The latching device is designed to latch the toilet lid in an open position based on the weight of a person acting on a toilet seat. The flushing control unit is further designed to control the flushing operation based on the toilet lid position, and to block the flushing operation upon detection of the toilet lid in the open position. This makes it possible to improve both the comfort and hygienic conditions for the toilet user while using the vacuum toilet.

20 Claims, 5 Drawing Sheets

(56) References Cited

U.S. PATENT DOCUMENTS

| | | |
|---|---|---|
| 5,400,446 A | 3/1995 | Bloemer et al. |
| 5,454,936 A | 10/1995 | Ask et al. |
| 5,455,971 A | 10/1995 | Sakakibara et al. |
| 5,703,567 A | 12/1997 | Cleveland |
| 5,901,384 A | 5/1999 | Sim |
| 5,926,099 A | 7/1999 | Unum |
| 6,161,814 A | 12/2000 | Jahrling |
| 6,202,227 B1 | 3/2001 | Gurowitz |
| 6,203,164 B1 | 3/2001 | Tufekci et al. |
| 6,226,807 B1 | 5/2001 | Rozenblatt et al. |
| 6,349,921 B1 | 2/2002 | Jahrling |
| 6,618,864 B2 | 9/2003 | Veal |
| 6,671,890 B2 | 1/2004 | Nishioka |
| 6,775,855 B1 | 8/2004 | Shannon |
| 6,944,888 B1 | 9/2005 | Canales, Jr. |
| 7,225,478 B2 | 6/2007 | Lim et al. |
| 7,516,939 B2 | 4/2009 | Bailey |
| 2001/0011391 A1 | 8/2001 | Rozenblatt |
| 2002/0007510 A1 | 1/2002 | Mann |
| 2003/0102450 A1 | 6/2003 | Parsons et al. |
| 2003/0154541 A1 | 8/2003 | Miller |
| 2004/0226083 A1 | 11/2004 | Wilson |
| 2005/0039249 A1 | 2/2005 | Maercovich et al. |
| 2005/0071914 A1 | 4/2005 | Marshall |
| 2005/0283891 A1 | 12/2005 | Lim |
| 2006/0041999 A1 | 3/2006 | Sanderson |
| 2006/0258915 A1 | 11/2006 | Ueda et al. |
| 2006/0277674 A1 | 12/2006 | Oakes, Jr. |
| 2006/0288472 A1* | 12/2006 | Pondelick ............. 4/431 |
| 2007/0056084 A1 | 3/2007 | Watt et al. |
| 2007/0250995 A1 | 11/2007 | White |
| 2008/0010734 A1 | 1/2008 | Chang |
| 2008/0072369 A1 | 3/2008 | Funari et al. |
| 2008/0086805 A1 | 4/2008 | Bush |
| 2008/0196151 A1 | 8/2008 | Oakes, Jr. |
| 2008/0209620 A1* | 9/2008 | Hand et al. ............. 4/314 |
| 2008/0271231 A1* | 11/2008 | Stauber et al. ......... 4/246.1 |
| 2009/0100580 A1 | 4/2009 | Su |
| 2009/0106885 A1 | 4/2009 | Sagre |
| 2009/0113614 A1 | 5/2009 | Yuen |
| 2009/0119142 A1 | 5/2009 | Yenni et al. |
| 2009/0160659 A1 | 6/2009 | Bailey |

FOREIGN PATENT DOCUMENTS

| | | |
|---|---|---|
| DE | 44 18 196 A1 | 12/1994 |
| DE | 44 15 832 A1 | 11/1995 |
| DE | 195 05 885 A1 | 8/1996 |
| DE | 196 03 834 A1 | 8/1997 |
| DE | 198 40 685 A1 | 4/1999 |
| DE | 10 2004 029 186 A1 | 1/2006 |
| DE | 10 2004 042 147 A1 | 3/2006 |
| DE | 10 2005 036 152 A1 | 2/2007 |
| DE | 10 2006 023 757 A1 | 11/2007 |
| DE | 10 2006 029 800 A1 | 12/2007 |
| DE | 10 2007 044 444 A1 | 4/2008 |
| DE | 10 2007 001 360 A1 | 7/2008 |
| DE | 10 2007 013 949 A1 | 9/2008 |
| WO | 03/003894 A1 | 1/2003 |

OTHER PUBLICATIONS

Dasell cabin interiors. A380 Standard Lavatory Product Information.

* cited by examiner

MONITORING DEVICE FOR A VACUUM TOILET

CROSS REFERENCE TO RELATED APPLICATIONS

This application claims the benefit of the filing date and priority to German Patent Application No. 10 2009 052 046.5, filed Nov. 5, 2009, and of U.S. Provisional Patent Application No. 61/258,425, filed Nov. 5, 2009, the applications of which are hereby incorporated herein by reference in their entirety.

TECHNICAL FIELD

The technical field relates to a device and a method for monitoring a vacuum toilet, in particular for a passenger transport vehicle.

BACKGROUND

In the area of passenger transport, for example trains, ships, aircraft or motor vehicles, a toilet fixture is a component of nearly every vehicle to satisfy contemporary comfort demands of passengers. Vacuum toilet systems lend themselves in particular to air travel, since the low ambient and outside pressure can be used at cruising altitude to generate the pressure differential between the toilet cabin and wastewater tank for transporting away the liquids and contaminants accumulated in the toilet bowl.

For example, DE 10 2007 013 949 describes a flushing device and method for vacuum toilets, in which a flushing operation is initiated after using the toilet by activating an actuator. The wastewater is here transported via a generated vacuum.

Vacuum toilets are often equipped with toilet lids that can be moved between an essentially vertical and horizontal position. In general, the toilet lid is joined with the rear area of a toilet bowl by means of a hinge. Damping elements that delay and decelerate the toilet lid as it lowers are known to prevent the lid from being knocked freely from the vertical position into the closed position. For example, DE 10 2004 029 B4 describes a damping unit for controllably opening and closing a toilet lid hinged to a toilet bowl in the area of a bearing.

In conventional automated toilets, toilet control can be initialized by activating the actuator in such a way that a flushing and suction operation takes place. When flushing with the toilet lid open, not only can noises be emitted, but bacteria or virus-containing aerosols can be transported into the air outside the toilet bowl, there becoming a source of contamination for the toilet users. In contemporary toilets, it is also possible to press the flush switch or actuator while using the toilet. As a result, a seated toilet user can be contaminated by microorganisms on the toilet lid, either by way of splashing water or preceding contact. Finally, users may jam their fingers between the toilet lid and toilet bowl or seat during the automated lid closing process.

At least one object is to improve both the hygienic protection and personal protection of the toilet users. In addition, other objects, desirable features, and characteristics will become apparent from the subsequent summary and detailed description, and the appended claims, taken in conjunction with the accompanying drawings and this background.

SUMMARY

The embodiments described below relate to a monitoring device, a method for monitoring a vacuum toilet, and a personal transport vehicle equipped with a monitoring device.

In an exemplary embodiment, a monitoring device for monitoring a vacuum toilet is provided with a position detector for detecting the position of a toilet lid, a mechanical latching device for latching the toilet lid, and a flushing control unit. The latching device is here configured in such a way as to latch the toilet lid in an open position in response to the weight of a person acting on a toilet seat. The flushing control unit is further designed for controlling a flushing operation in the vacuum toilet based on detecting the position of the toilet lid, wherein the flushing operation is blocked upon detection of the toilet lid in an open position.

This makes it possible to satisfy required hygienic and personal protection demands during use of the toilet, since the flushing and suction operation cannot take place when a person is seated on the toilet.

The mechanical latching device becomes activated when the toilet user puts some or all of his or her weight on the lavatory or toilet seat. The mechanical latching device activated by the force of the weight ensures that the toilet lid cannot inadvertently fall on a person seated on the toilet. In particular in transport vehicles, this makes it possible to avoid potential injuries, since the lid can no longer be moved due to jolts experienced during rapid stops and starts, for example, or in the case of air travel as the result of possible turbulence during a flight.

In addition to the mechanical latching device, the entire monitoring device can be used to prevent an uncontrolled flushing and suction operation. After a position detector has detected that the toilet lid is in the open position set by the mechanical latching device, each rinsing and suction operation is blocked. For example, this becomes necessary when the toilet user does no initiate the flushing and suction operation when standing, as customary, but is still in a seated position on the toilet seat.

The flushing operation can be initiated when seated either intentionally or unintentionally. For example, children who are relatively unsteady when seated on the toilet seat in light of their size can unintentionally activate the actuator out of curiosity, so that their seated position might not remain stable under certain conditions. Further, in particular in transport vehicles that can make jerky motions while traveling, an attempt at finding support on the toilet cabin wall might inadvertently initiate a flushing operation, or the person might support him or herself on the toilet seat after intentionally initiating a flushing operation. However, the monitoring device prevents the lid from closing in response to the weight of a body acting on the toilet seat, locking it in the open position. This makes it possible to prevent any jamming of fingers and other body parts.

Since a certain number of microorganisms can get into the environment of the toilet during each flushing operation via droplet formation, the monitoring device offers a high level of hygienic protection by preventing a flushing operation with the toilet open. This makes it possible to reduce dangers posed by aerogenic infections, in which aerosols can penetrate into the region of the respiratory passages, or caused by contamination with surfaces of the sanitary fixture, e.g., the toilet lid.

If the toilet user stands and no more weight acts on the toilet seat, the toilet lid can again move freely, and manually closed by the user.

In another exemplary embodiment of the monitoring device, the position detector is configured to determine the upper end position and/or lower end position of the toilet lid. Suitable position detectors can be used to determine the following end positions of the toilet lid. In the upper end position, the toilet lid is completely opened, assuming an essentially perpendicular position, while the lower end position describes the closed, horizontal toilet lid position. The detector units are designed to determine whether the respective end positions are being entered or exited. Suitable position detectors include contact sensors, light barriers or proximity sensors.

Using just a single detector may suffice for monitoring device function. For example, the upper end position could be established by means of a magnetic contact detector in the latched position. If the toilet lid exits this latched position, a contact signal is no longer detected, and the flushing operation can be initiated after a prescribed period of time required for closing the toilet lid.

By contrast, if only one detector for determining the lower end position is installed in the area of the lavatory or toilet seat, the rinsing operation can be initiated once it has been detected that the toilet lid is resting on the toilet seat. Closing the toilet makes it possible to use the noise-damping effect of the toilet lid.

In another exemplary embodiment, the mechanical latching device has at least one restoring element, which can be joined with a toilet seat. Restoring elements, e.g., springs, can be used to move the lavatory or toilet seat against a defined spring force in the direction of the toilet bowl in response to weight exerted by the toilet user, thereby causing the toilet lid to become latched or blocked in the upright position. Since a mechanical latching device is involved, this makes it possible to ensure, independently of power failures, that the lid is latched in the upright position when the toilet seat is exposed to a full or partial load.

In another exemplary embodiment, the monitoring device has an actuator for moving the toilet lid, a monitoring unit for controlling the actuator, and a personal sensor. In this case, the personal sensor can detect a person in proximity to the vacuum toilet, and the monitoring device is designed to block closure of the lid and prevent the flushing and suction operation if the personal sensor has detected a person. The actuator can be used to automatically close the lid. Actuators include all known toilet lid drives. These toilet lid drives generally make it possible to both close and open the toilet lid.

The position detector can determine whether persons or an animal are in proximity to the vacuum toilet, and might be endangered. When the presence of a person has been ascertained based on detection by the personal sensor, the actuator for moving the toilet lid is controlled in such a way as to block the closure of the lid and the flushing and suction operation, even if the person has not yet touched the toilet seat.

The actuator can further be used to trigger a defined logical sequence of a lid closure, flushing and suction operation. In this way, the lid can be closed automatically after corresponding unlatching and release, after which the flushing and suction operation take place under optimal conditions with respect to hygiene and personal protection.

In another exemplary embodiment, the personal sensor is selected from a group of sensors, wherein the group consists of a motion sensor, an ultrasound sensor, a temperature sensor, an infrared sensor, a weight sensor and a Hall sensor.

Motion sensors or light barriers, which are able to apply one or more of the sensor techniques mentioned above, can be used to transmit information to the monitoring unit when a potential user has entered the toilet, for example. These sensor data can here be sent to the monitoring unit either by wireless or wired means. Once the monitoring unit has received information that a person is present in proximity to the toilet, lid closure is blocked to preclude potential contamination or injury, for example from fingers getting jammed between the toilet seat and lid.

In another exemplary embodiment, the flushing control unit is designed to block a flushing operation when an actuator is activated to flush the vacuum toilet if the personal sensor has detected a person. This makes it possible to provide potential users of the vacuum toilet with optimal hygienic protection, since no flushing operations can be initialized for as long as a person is located in proximity to the vacuum toilet. The vicinity in which a signal indicating someone is present is sent can be confined very narrowly around the toilet unit, so that an initiated sequence of lid closure and flushing can take place with the passenger still present in the toilet cabin, for example standing in front of the sink to wash his or her hands.

In another exemplary embodiment, the monitoring unit is designed to initiate closure of the toilet lid followed by flushing of the vacuum toilet based on detection data of the position detector and settable time intervals. This makes it possible to perform the lid closure, flushing and suction operation in a chronologically defined, logical sequence. As a result, a suitable time interval can ensure a reliable closure of the toilet lid without intervention by the user, for example.

Another exemplary embodiment provides a personal transport vehicle with a monitor. This makes it possible to improve user comfort and safety during the use of toilets in the area of personal transport, for example in buses, trains and ships. Monitoring technology can also be applied generally in the area of household, supply and process technology, where toilets, in particular vacuum toilets, are used. Ensuring that the necessary hygienic and personal protection requirements are observed during a lid closure and suction operation yield advantages in particular in the area of air travel.

In another exemplary embodiment, the monitoring device is used in an aircraft.

The closed position of the toilet lid during the flushing and suction operation makes it possible to increase the comfort of both the toilet users and passengers in the cabin, since the noise emissions arising in particular during the flushing and suction operation of a vacuum toilet can be greatly reduced.

One exemplary embodiment indicates a method for monitoring a vacuum toilet, wherein the method involves the following steps: Mechanically latching the toilet lid in an open position. The toilet lid is prevented from closing by the weight of the person acting on the toilet seat, detecting a position of the toilet lid using a position detector, and controlling a flushing operation based on the detection of the toilet lid position by a position detector. The flushing operation is blocked given the detection of the toilet lid in an open position. In this way, the required hygienic and personal protection requirements can be met with the toilet lid in an open position.

Let it further be noted that the above features can also be combined. The combination of features above can result in interacting effects and actions going beyond the individual actions of the corresponding features, even if this is not expressly described in detail. Exemplary embodiments of the invention will be described with reference to the drawings below.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

The drawings on the figures are diagrammatic and not to scale. Further, the same reference numbers are used for identical or similar elements in the following description of the figures.

Figure 1:
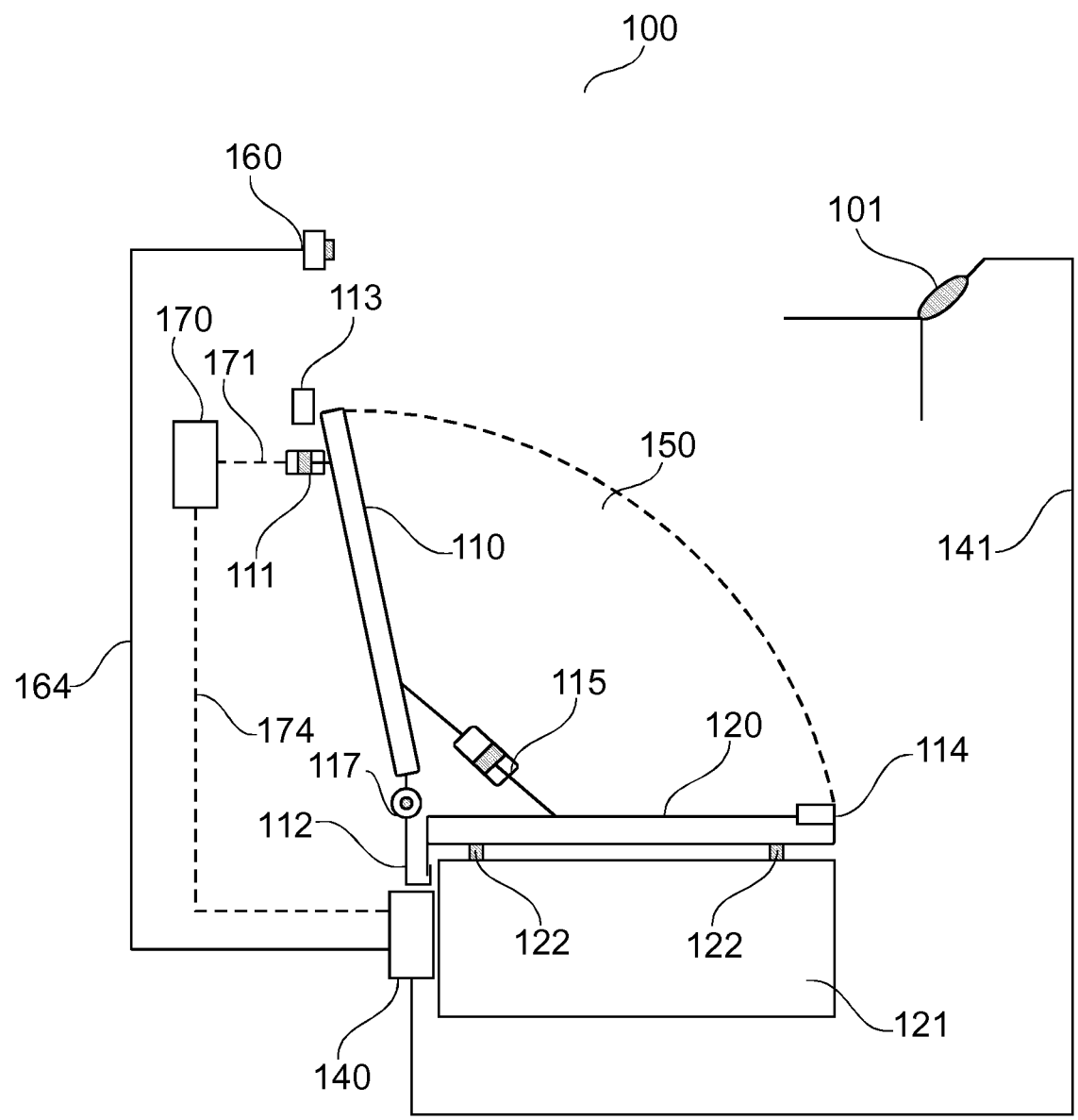
FIG. 1 shows a diagrammatic view of a monitoring device for a vacuum toilet with a mechanical latching device, sensor devices and control units according to an exemplary embodiment.

FIG. 1 shows a diagrammatic representation of a monitoring device 100 for a vacuum toilet 150 with a mechanical latching device 112, sensor devices 101, 113, 114, a flushing control unit 140 and a monitoring unit 170. The vacuum toilet 150 has a toilet bowl 121 and a lavatory or toilet seat 120 sitting on the toilet bowl.

The toilet seat 120 can optionally be partially hinged to the toilet bowl 121. This figure does not show connecting lines, containers or pumping devices for supplying the flushing water or disposing the wastewater. A toilet lid 110 is pivoted by a bearing 117 in the rear area of the toilet seat 120 or toilet bowl 121. Situated on the toilet lid 110 is a damping element 115 to allow controlled, decelerated movement of the toilet lid 110 while opening and closing it.

FIG. 1 shows the vacuum toilet 150 in the completely open position. This means that the toilet lid 110 is essentially situated upright, so that the upper lid edge located close to the position detector 113 is situated on the opposite side of the bearing 117 or fulcrum. In this position, which is referred to in the following as the upper end position, the toilet lid 110 has exceeded dead center in such a way that the toilet lid 110 is no longer lowered under its own gravitational force. A dashed curved line on FIG. 1 denotes the closing motion of the toilet lid 110 from the upper end position into the lower end position.

The lower end position can be determined by the position detector 114, which is arranged on the toilet seat 120, while the upper end position can be determined by the position detector 113. The position detectors 113, 114 can be optically or magnetically based. Hall sensors can be used to detect the movement of the pivoting toilet lid 110. The position detectors are connected by wireless or wired means with at least one control unit 170, so that the detected positions can be relayed on to the control units 170, 140.

FIG. 1 further shows an actuator 111 for automatically opening and closing the toilet lid 110, which can be controlled by a monitoring unit 170. The actuator 111 can be any of the known toilet lid drives. The monitoring unit 170 is connected with the actuator via a connecting line 171. The monitoring unit 170 can further be wired via lines 174, 141 and 164 or wirelessly connected with other units of the monitoring device 100, such as a personal sensor 101 or the flushing control unit 140. For example, if the monitoring unit 170 receives a trigger signal via the trigger device 160, followed by information from the personal sensor 101 that the toilet user has exited the toilet cabin, closure of the toilet lid 110 via the actuator 111 can be initiated by way of terminal 171. Finally, a release signal for the flushing controller can be transmitted after the position detector 114 has detected the lower end position of the toilet lid 110.

Figure 2:
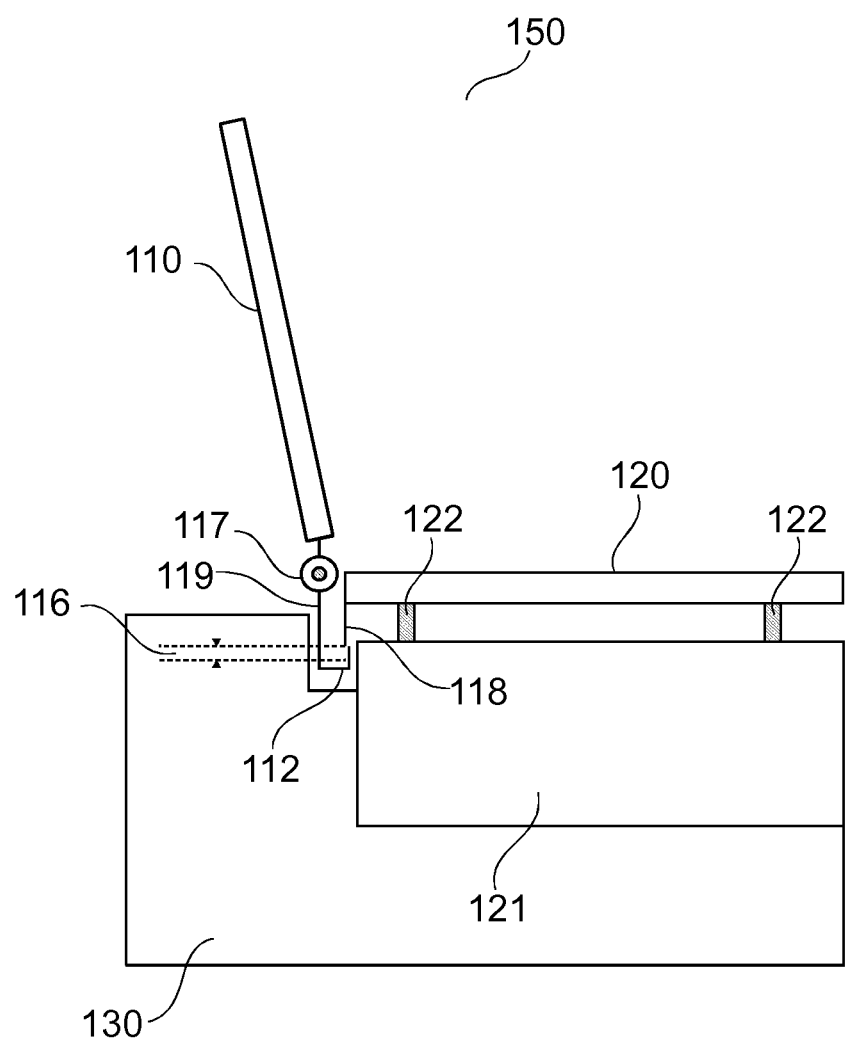
FIG. 2 shows a diagrammatic view of a monitoring device with an inactive mechanical latching device of a toilet lid according to an embodiment.
Figure 3:
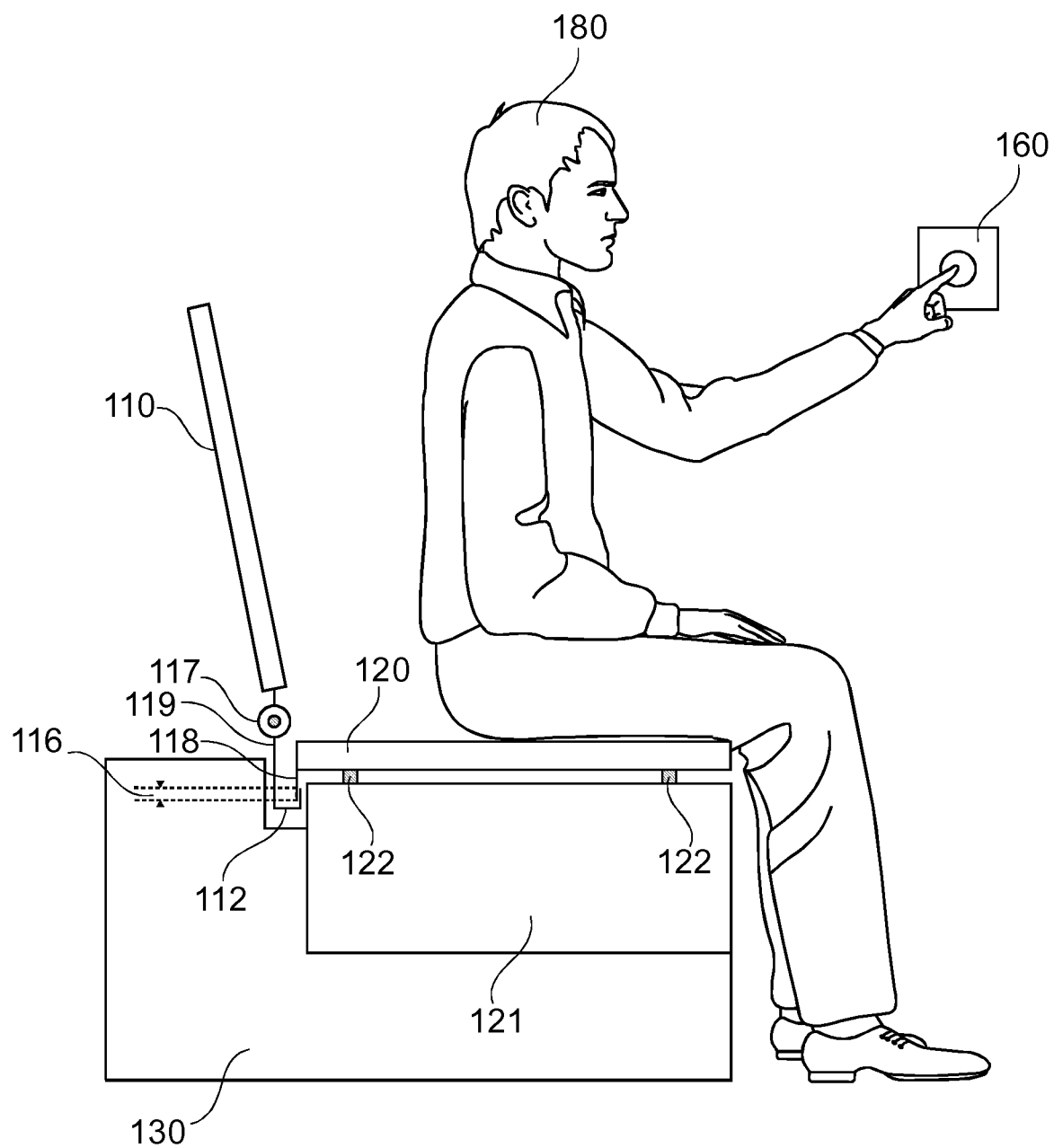
FIG. 3 shows a diagrammatic view of a mechanical device for blocking the toilet lid activated by the weight of a person according to an exemplary embodiment.

FIG. 1 further depicts a mechanical latching device 112, which operates with the help of the restoring elements 122 secured to the toilet seat, and is shown in detail on FIG. 2 and FIG. 3.

FIG. 2 shows a diagrammatic view of an inactive mechanical latching device 112 of a vacuum toilet 150 with a diagrammatic toilet cladding 130. Since the air is suctioned during the flushing operation not behind the cladding 130, but directly in front of the toilet cladding 130 in a vacuum toilet 150, considerable noise is generated in the flushing process with the toilet lid 110 in the open position. For this reason, the vacuum toilet 150 is closed prior to the flushing operation to dampen the noise. If the latched position of the toilet lid 110 is detected, for example as the result of determining an overlap 116 of latching elements 118 and 119, the control unit 140 can be used to block the flushing and suction operation with the toilet lid 110 open.

The mechanical latching device 112 has a first latching element 118 secured to the toilet seat 120, and a second latching element 119 secured to the bearing 117. In the inactive state of the mechanical latching device 112, the restoring elements 122 are not stressed, and are in a relaxed state. There is no overlap 116 between the two latching elements 118 and 119. In this unlatched state, the toilet lid 110 can be freely moved by the user or a suitable automatic drive.

As opposed to FIG. 2, FIG. 3 presents a view of a mechanical latching device 112 activated by the weight of a person in order to block the toilet lid. The mechanical latching device 112 is activated when a person 180 uses his or her body weight to press down the restoring elements 122 against a defined spring force. This creates an overlap 116 between the two latching elements 118 and 119, which cause the toilet lid motion to be blocked. The latched position corresponds to the upper end position, which was already outlined in the description of FIG. 1.

If the toilet user 180 intends to initiate the flushing operation via the trigger device 160 while seated, as depicted on FIG. 3, neither a lid closure nor a flushing operation is performed in order to protect the user 180. This blockade remains in place for as long as the mechanical latching device is activated, and a suitable position detector (e.g., 113, 114 on FIG. 1) detects the open position of the vacuum toilet 150.

Figure 4:
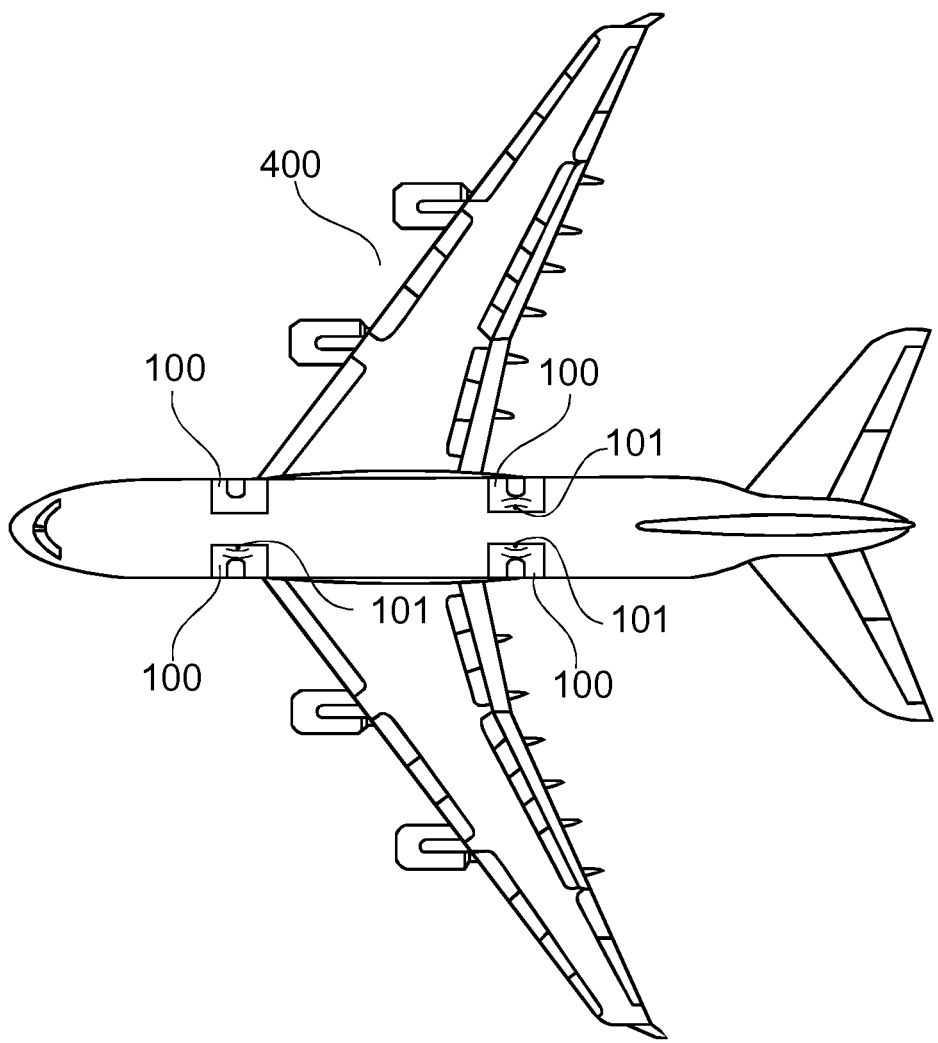
FIG. 4 shows a two-dimensional diagrammatic view of an aircraft with four exemplary embodiments.

FIG. 4 shows an aircraft 400 with four monitoring devices 100, which are in part equipped with personal sensors 101. In these toilet cabins, for example, a lid closure and ensuing flushing operation can be combined with the unlocking or locking of the doors to the vacuum toilet 150.

Figure 5:
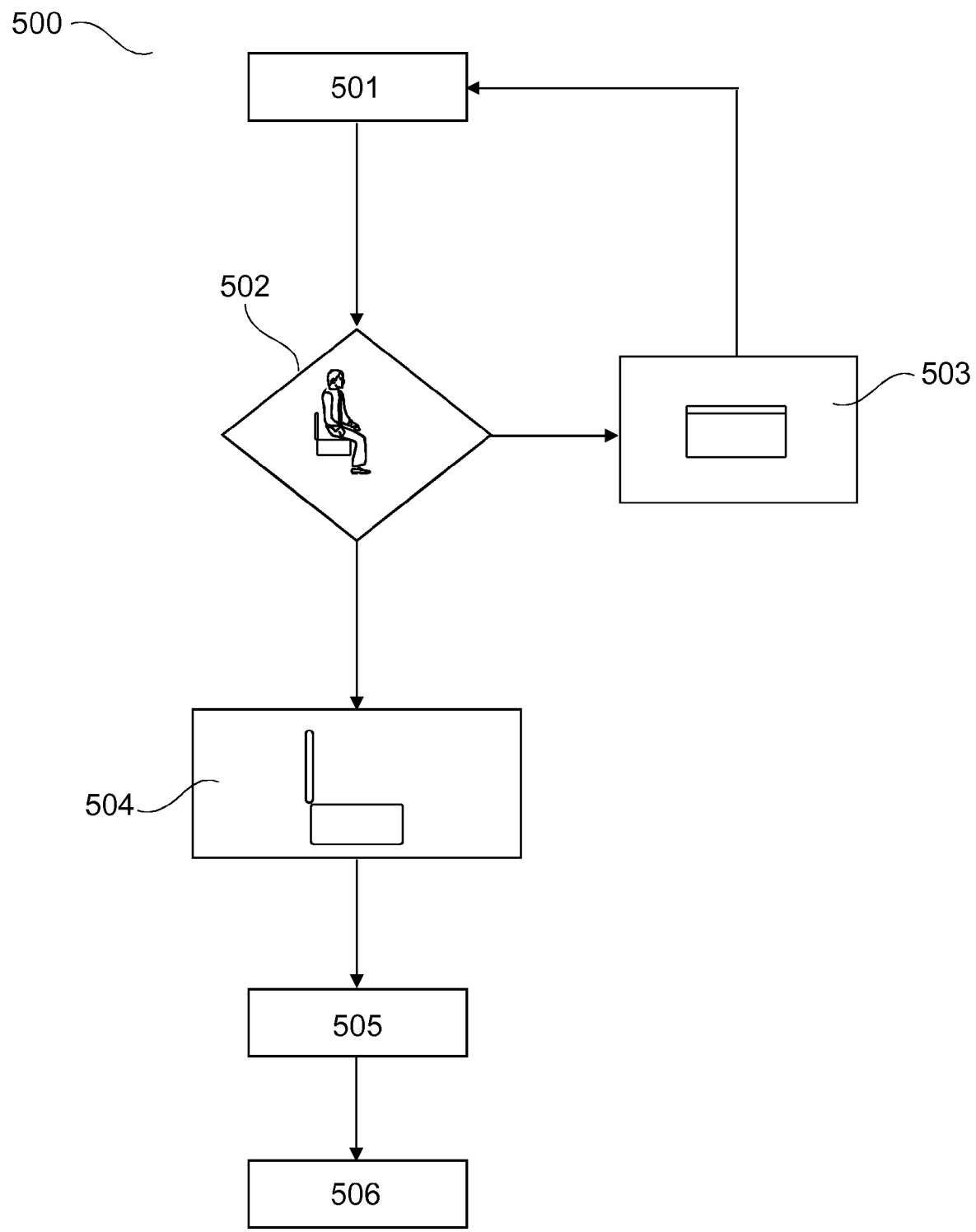
FIG. 5 shows a diagrammatic view of a method for monitoring a vacuum toilet according to an exemplary embodiment.

FIG. 5 shows a diagrammatic view of a method 500 for monitoring a vacuum toilet with the procedural steps 501 to 506. In the first procedural step 501, the procedure begins. In the second procedural step 502, a decision is made as to whether a person is placing weight on the toilet seat or not. If no person is present or a person has already stood up, the toilet lid is freely movable, and can be completely closed, as diagrammatically indicated in procedural step 503. The procedure then starts over again at step 501. However, if a person places a partial or full load on the toilet seat, for example by sitting down, procedural step 504 is initiated, during which the toilet lid 110 is mechanically latched in an open position. Therefore, procedural step 504 activates the mechanical latching device 112, and prevents the toilet lid from moving.

This causes the vacuum toilet to remain in an open state, and the toilet lid 110 cannot flip down unintentionally.

In procedural step 505, the position of the vacuum toilet is detected. Based on the received position data, a control unit actuates the flushing operation in the next procedural step 506, wherein the flushing operation is blocked with the toilet lid 110 in the open position. This makes it possible to improve the hygienic and personal protection conditions for using a vacuum toilet. For example, one possible expansion of this method involves also using the information gathered by personal sensors as the basis for controlling the toilet. For example, lid closure and flushing can be blocked if a person was detected in proximity to the vacuum toilet by means of a personal sensor.

Let it be noted that the term "comprising" does not preclude other elements or procedural steps, and that the term "a" and "an" does not rule out a plurality of elements and steps. The used reference numbers serve only to enhance comprehension, and should in no way be regarded as limiting, wherein the claims reflect the scope of protection. While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A monitoring device for monitoring a vacuum toilet, comprising:
    a position detector adapted to detect a position of a toilet lid;
    a mechanical latching device that latches the toilet lid in an open position, the mechanical latching device including a first latching element and a second latching element; and
    a flushing control unit adapted to control a flushing operation of the vacuum toilet based on a detection of the position of the toilet lid,
    wherein the mechanical latching device latches the toilet lid in response to a weight of a person acting on a toilet seat such that a movement of the toilet lid from the open position to a closed position is blocked by an overlap between the first latching element and the second latching element, and
    wherein the flushing operation is blocked upon the detection of the toilet lid in the open position.

2. The monitoring device of claim 1, wherein the position detector is adapted to determine an end position of the toilet lid.

3. The monitoring device of claim 2, wherein the end position is an upper end position.

4. The monitoring device of claim 2, wherein the end position is a lower end position.

5. The monitoring device of claim 1, wherein the mechanical latching device has at least one restoring element that is adapted to connect with the toilet seat.

6. The monitoring device of claim 1, further comprising:
    an actuator adapted to move the toilet lid;
    a monitoring unit adapted to control the actuator; and
    a personal sensor is adapted to detect the person in proximity to the vacuum toilet,
    wherein the monitoring unit is adapted to block closure of the toilet lid if the personal sensor detects the person.

7. The monitoring device of claim 6, wherein the personal sensor is a motion sensor.

8. The monitoring device of claim 6, wherein the personal sensor is an ultrasound sensor.

9. The monitoring device of claim 6, wherein the personal sensor is a temperature sensor.

10. The monitoring device of claim 6, wherein the personal sensor is an infrared sensor.

11. The monitoring device of claim 6, wherein the personal sensor is a weight sensor.

12. The monitoring device of claim 6, wherein the personal sensor is a Hall sensor.

13. The monitoring device of claim 6, wherein the flushing control unit is adapted to block the flushing operation when the actuator is activated to flush the vacuum toilet if the personal sensor has detected the person.

14. The monitoring device of claim 6, wherein the monitoring unit is adapted to initiate the closure of the toilet lid followed by a flushing of the vacuum toilet based on a detection data of the position detector and settable time intervals.

15. A method for monitoring a vacuum toilet, the method comprising the steps of:
    mechanically latching a toilet lid in an open position with a mechanical latching device including a first latching element and a second latching element to block a movement of the toilet lid from the open position to a closed position by a weight of a person acting on a toilet seat that causes an overlap between the first latching element and the second latching element;
    detecting a position of the toilet lid using a position detector;
    controlling a flushing operation based on the detecting the position of the toilet lid by the position detector; and
    blocking the flushing operation given the detecting of the toilet lid in the open position.

16. The method of claim 15, further comprising determining an end position of the toilet lid with the position detector.

17. The method of claim 16, wherein the end position is an upper end position.

18. The method of claim 15, wherein the blocking the flushing operation when an actuator is activated to flush the vacuum toilet if a personal sensor has detected the person.

19. The method of claim 15, further comprising initiating a closure of the toilet lid followed by a flushing of the vacuum toilet based on detection data of the position detector and settable time intervals.

20. A transport vehicle, comprising:
    a vacuum toilet;
    a monitoring device adapted to monitor the vacuum toilet, the monitoring device comprising:
        a position detector adapted to detecting a position of a toilet lid;
        a mechanical latching device that latches the toilet lid in an open position, the mechanical latching device including a first latching element and a second latching element; and
        a flushing control unit adapted to control a flushing operation of the vacuum toilet based on a detection of the position of the toilet lid,
        wherein the mechanical latching device latches the toilet lid in response to a weight of a person acting on a toilet seat such that movement of the toilet lid from the open position to a closed position is blocked by an overlap between the first latching element and the second latching element, and wherein the flushing operation is blocked upon the detection of the toilet lid in the open position.

* * * * *